(12) United States Patent
Maski

(10) Patent No.: US 11,032,426 B2
(45) Date of Patent: *Jun. 8, 2021

(54) METHOD AND APPARATUS FOR ENABLING A MOBILE ENDPOINT DEVICE TO BE A HUB FOR A CONFERENCE CALL

(71) Applicant: AT&T Intellectual Property I, L.P., Atlanta, GA (US)

(72) Inventor: John M. Maski, Alameda, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 68 days.

This patent is subject to a terminal disclaimer.

(21) Appl. No.: 16/017,825

(22) Filed: Jun. 25, 2018

(65) Prior Publication Data
US 2018/0309876 A1    Oct. 25, 2018

Related U.S. Application Data

(63) Continuation of application No. 15/495,372, filed on Apr. 24, 2017, now Pat. No. 10,009,473, which is a
(Continued)

(51) Int. Cl.
*H04W 88/04* (2009.01)
*H04W 4/08* (2009.01)
(Continued)

(52) U.S. Cl.
CPC ............ *H04M 3/56* (2013.01); *H04L 65/403* (2013.01); *H04W 4/08* (2013.01); *H04W 4/80* (2018.02);
(Continued)

(58) Field of Classification Search
CPC ........... H04M 1/7253; H04M 2250/64; H04M 2250/02; H04M 2250/62; H04M 3/562;
(Continued)

(56) References Cited

U.S. PATENT DOCUMENTS 6,577,622 B1    6/2003  Schuster et al.
7,031,665 B1    4/2006  Trell
(Continued)

FOREIGN PATENT DOCUMENTS

CN    2667810 Y    12/2004
CN    202126844 U    1/2012
(Continued)

OTHER PUBLICATIONS

Wu, Xiaotao, and Henning Schulzrinne. "sipc, a multi-function SIP user agent." Management of Multimedia Networks and Services. Springer Berlin Heidelberg, 2004. 269-281. http://www1.cs.columbia.edu/~xiaotaow/rer/Research/Paper/mmns2004.pdf.
(Continued)

*Primary Examiner* — Awet Haile

(57) ABSTRACT

A method, computer-readable storage device and apparatus for enabling a mobile endpoint device to be a hub for a conference call are disclosed. For example, the method connects to the conference call, broadcasts a signal to at least one slave mobile endpoint devices to join the conference call over a personal area network, receives a pairing request from the at least one slave mobile endpoint device over the personal area network, accepts the pairing request and connects the at least one slave mobile endpoint device to the conference call via the master mobile endpoint device over the personal area network, wherein both the master mobile endpoint device and the at least one slave mobile endpoint device have two-way communications with the conference call and conference call controls.

20 Claims, 4 Drawing Sheets

100

Related U.S. Application Data continuation of application No. 14/085,701, filed on Nov. 20, 2013, now Pat. No. 9,635,698.

(51) Int. Cl.
*H04W 4/80* (2018.01)
*H04L 29/06* (2006.01)
*H04W 12/06* (2021.01)
*H04M 3/56* (2006.01)
*H04W 76/15* (2018.01)
*H04W 12/50* (2021.01)
*H04W 76/40* (2018.01)
*H04W 8/00* (2009.01)
*H04W 84/20* (2009.01)

(52) U.S. Cl.
CPC ........... *H04W 12/06* (2013.01); *H04W 12/50* (2021.01); *H04W 76/15* (2018.02); *H04W 88/04* (2013.01); *H04W 8/005* (2013.01); *H04W 76/40* (2018.02); *H04W 84/20* (2013.01)

(58) Field of Classification Search
CPC ... H04W 4/206; H04W 76/023; H04W 84/18; H04W 4/08; H04W 76/025
See application file for complete search history.

(56) References Cited

U.S. PATENT DOCUMENTS

| | | | |
|---|---|---|---|
| 7,254,123 B2 | 8/2007 | Jukarainen | |
| 7,327,981 B2 | 2/2008 | Hundal | |
| 7,363,045 B2 | 4/2008 | Rogalski et al. | |
| 7,899,445 B2 | 3/2011 | Guccione | |
| 7,937,066 B2 | 5/2011 | Kaltsukis | |
| 8,095,120 B1* | 1/2012 | Blair | H04M 3/562 379/202.01 |
| 8,326,276 B2 | 12/2012 | Chin et al. | |
| 2003/0044654 A1 | 3/2003 | Holt | |
| 2008/0031176 A1 | 2/2008 | Hus | |
| 2008/0160977 A1* | 7/2008 | Ahmaniemi | H04L 12/1822 455/416 |
| 2009/0011753 A1* | 1/2009 | Barnier | H04B 5/0062 455/422.1 |
| 2009/0264114 A1* | 10/2009 | Virolainen | H04M 3/56 455/416 |
| 2010/0066804 A1 | 3/2010 | Shoemake | |
| 2010/0241721 A1* | 9/2010 | Cha | H04L 65/403 709/206 |
| 2011/0065385 A1 | 3/2011 | Geslin et al. | |
| 2011/0281580 A1 | 11/2011 | Tonogai et al. | |
| 2012/0184257 A1 | 6/2012 | Yang et al. | |
| 2012/0252422 A1 | 10/2012 | Gupta | |
| 2012/0322379 A1* | 12/2012 | Eun | H04W 4/21 455/41.2 |
| 2013/0017780 A1 | 1/2013 | Rose et al. | |
| 2013/0029648 A1 | 1/2013 | Soundrapandian et al. | |
| 2013/0064142 A1 | 3/2013 | Bhow | |
| 2013/0065637 A1 | 3/2013 | Tasker | |
| 2013/0077537 A1 | 3/2013 | Zhakov | |
| 2014/0085406 A1* | 3/2014 | Narayanan | H04N 7/152 348/14.09 |
| 2014/0194059 A1* | 7/2014 | Milosevski | H04W 4/06 455/41.1 |
| 2014/0364060 A1 | 12/2014 | Srivastava | |

FOREIGN PATENT DOCUMENTS

| | | |
|---|---|---|
| EP | 1851942 A1 | 11/2007 |
| EP | 1897355 A1 | 3/2008 |
| GB | 2409789 A | 7/2005 |
| GB | 2452020 A | 2/2009 |
| WO | WO 03053089 A1 | 6/2003 |
| WO | WO 2006116937 A1 | 11/2006 |

OTHER PUBLICATIONS

Greaves, Andrew, and Enrico Rukzio. "Interactive Phone Call: Exploring Interactions during Phone Calls using Projector Phones." Workshop on Ensembles of On-Body Devices at Mobile HCI. 2010. http://www.comp.lancs.ac.uk/~rukzio/publications/ensembles2010_greaves.pdf.

Howie, Douglas, et al. "State-of-the-art SIP for mobile application supernetworking." Nordic Radio Symposium, Oulu, Finland. 2004. http://citeseerx.ist.psu.edu/viewdoc/download?.

Albrecht, Markus, et al. "IP services over Bluetooth: leading the way to a new mobility." Local Computer Networks, 1999. LCN'99. Conference on. IEEE, 1999. http://www.cs.nccu.edu.tw/~ttsai/mobilecomm_ttsai/bluetooth/albrecht.pdf.

Law, Ching, and Kai-Yeung Siu. "A Bluetooth scatternet formation algorithm." Global Telecommunications Conference, 2001. GLOBECOM'01. IEEE. vol. 5. IEEE, 2001. http://erdos.csie.ncnu.edu.tw/~ccyang/WirelessNetwork/Papers/Bluetooth/BTScatternet-4.pdf.

* cited by examiner

METHOD AND APPARATUS FOR ENABLING A MOBILE ENDPOINT DEVICE TO BE A HUB FOR A CONFERENCE CALL

This application is a continuation of U.S. patent application Ser. No. 15/495,372, filed Apr. 24, 2017, now U.S. Pat. No. 10,009,473, which is a continuation of U.S. patent application Ser. No. 14/085,701, filed Nov. 20, 2013, now U.S. Pat. No. 9,635,698, all of which are herein incorporated by reference in its entirety.

BACKGROUND

Currently, when a user calls into a conference call with multiple colleagues or other users, a user may dial into the conference call using a Polycom® device or other conferencing hub. Typically, the Polycom® device calls into a conferencing bridge or to another caller via a landline telephone call. However, some users in a large conference room may be far away from the speaker and may not be in a position to hear the Polycom® output device or the other party on the conference call may not be able to hear other users relatively far away from the Polycom® input device. In addition, specialized conferencing equipment such as Polycom® devices are often quite expensive.

Alternatively, multiple users may separately dial into a conference bridge to conduct a conference call. However, issues with latency, lag and echo may cause issues with the quality of the conference call. Another alternative is to have multiple users gather around closely a user's device that is placed on speaker phone mode to conduct the conference call if no Polycom® device is available. Notably, all of these alternatives have drawbacks.

SUMMARY

In one embodiment, the present disclosure provides a method, computer-readable storage device, and an apparatus for enabling a mobile endpoint device to be a hub for a conference call. In one embodiment, the method connects to the conference call, broadcasts a signal to at least one slave mobile endpoint devices to join the conference call over a personal area network, receives a pairing request from the at least one slave mobile endpoint device over the personal area network, accepts the pairing request and connects the at least one slave mobile endpoint device to the conference call via the master mobile endpoint device over the personal area network, wherein both the master mobile endpoint device and the at least one slave mobile endpoint device have two-way communications with the conference call and conference call controls.

BRIEF DESCRIPTION OF THE DRAWINGS

The essence of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method, computer-readable storage device and apparatus for enabling a mobile endpoint device to be a hub for a conference call. As discussed above, the available options for conducting a conference call all have drawbacks due to inconvenience, latency, lag, echoing or costs. One embodiment of the present disclosure allows users to leverage the users' personal mobile endpoint devices (e.g., a cellular telephone or a smart phone) as a hub for a conference call. As a result, each user may have some conference call controls on his or her personal mobile endpoint device that is connected to a master mobile endpoint device via a personal area network (PAN) that uses a near field communications protocol (e.g., Bluetooth®, Zigbee® and the like).

Figure 1:
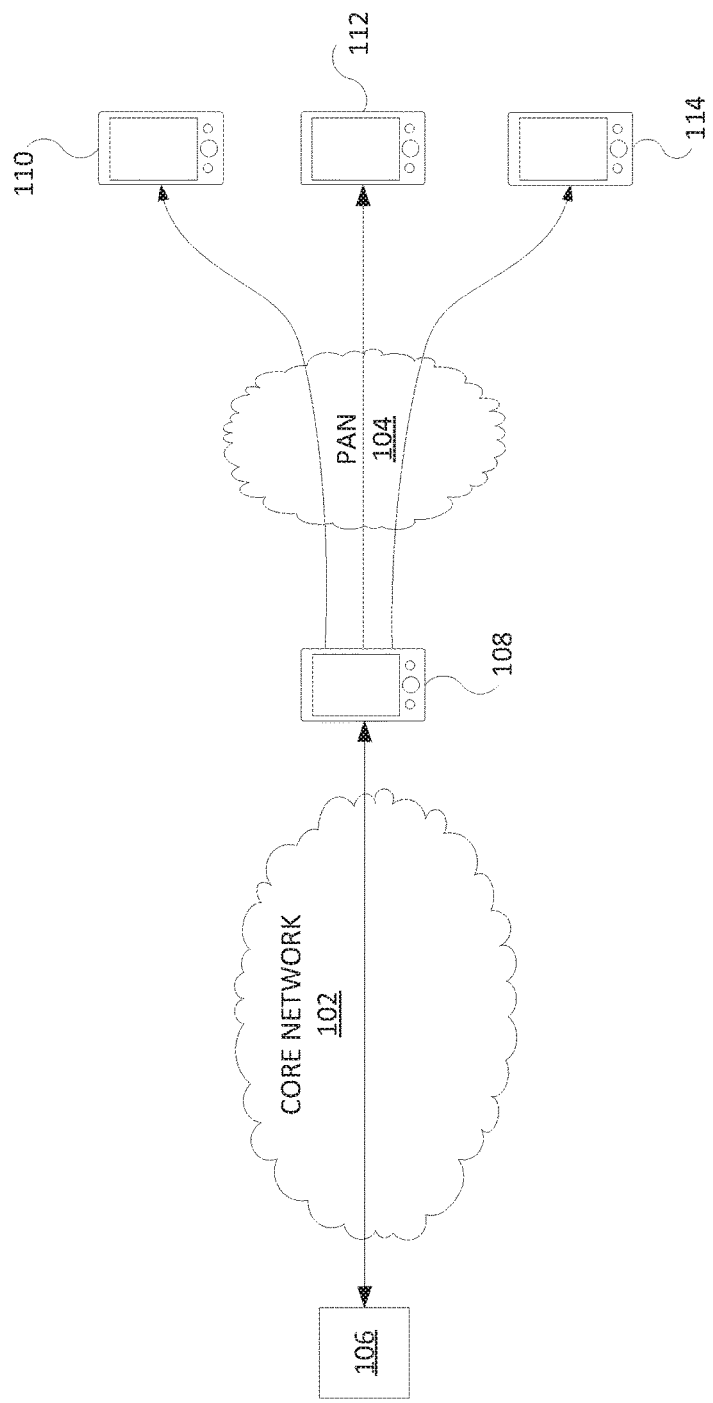
FIG. 1 illustrates one example of a communication network of the present disclosure.

FIG. 1 is a block diagram depicting one example of a communication network 100. For example, the communication network 100 may be any type of communication network, such as for example, a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, and the like related to the current disclosure. It should be noted that an IP network is broadly defined as a network that uses Internet Protocol to exchange data packets.

For example, the communication network 100 may include a core network 102, a personal area network (PAN) 104, an endpoint device 106 and one or more mobile endpoint devices 108, 110, 112 and 114. In one embodiment, the core network 102 may be an Internet Protocol (IP) network (e.g., an IP Multimedia Subsystem (IMS) network) that may provide wireless communication services to the mobile endpoint devices 108, 110, 112 and 114.

In one embodiment, the wireless communication services may be cellular communication (e.g., 2G, 3G, 4G, LTE, and the like) services. In another embodiment, the communication services may be wireless communication services such as a wireless fidelity (Wi-Fi) service. In one embodiment, the communication network 100 may include one or more access networks (not shown) such as a cellular network, a Wi-Fi network, a cable network and the like, situated between the core network 102 and the mobile endpoint device 108 and/or the endpoint device 106. In one embodiment, the communication network 100 in FIG. 1 is simplified and it should be noted the communication network 100 may also include additional network elements (not shown), such as for example, border elements, gateways, firewalls, routers, switches, call control elements, various application servers, and the like.

In one embodiment, the endpoint device 106 may be any type of endpoint device used by a user for conference call services. For example, the endpoint device 106 may be a conference bridge in communication with the core network 102 or located in the core network 102. In another embodiment, the endpoint device 106 may be a telephone, a mobile telephone, a smart phone, a desktop computer, a laptop computer, a tablet computer, and the like.

In one embodiment, the mobile endpoint devices 108, 110, 112 and 114 may be any type of mobile endpoint devices, such as for example, a cellular telephone, a smart phone, a tablet computer with voice capability, and the like. In one embodiment, the mobile endpoint devices 108, 110, 112 and 114 may have a subscription to wireless communication services via the communication service provider of the core network 102. For example, the wireless communication service may be a cellular communication service or subscription. In another embodiment, the wireless communication service may be a service provider of Internet services that provides Wi-Fi communication services.

In other words, the mobile endpoint devices 108, 110, 112 and 114 are not general endpoint devices that require a landline or a wired telephone communication service that could be moved from location to location and re-connected (e.g., a Polycom® main speaker or hub, a terminal adapter, a landline telephone, and the like). In addition, the mobile endpoint devices 108, 110, 112 and 114 should not be interpreted as a simple input/output device such as a headset or a portable speaker that is technically "mobile". Rather, the mobile endpoint devices 108, 110, 112 and 114 are capable of obtaining cellular subscription services or Wi-Fi services and are capable of running application programs.

In one embodiment, the mobile endpoint device 108 may be referred to also as a master mobile endpoint device 108. In one embodiment, the master mobile endpoint device 108 may establish a connection to a conference call with the endpoint device 106 via the core network 102. In one embodiment, the endpoint device 106 may be a conference bridge that the master mobile endpoint device 108 dials into and connects with another caller (not shown). In one embodiment, the endpoint device 106 may be another telephone or computer that the master mobile endpoint device 108 is calling directly for conferencing services.

In one embodiment, the mobile endpoint devices 110, 112 and 114 may also be referred to as slave mobile endpoint devices 110, 112 and 114. Although only three slave mobile endpoint devices are illustrated in FIG. 1, it should be noted that any number of slave mobile endpoint devices may be deployed. In one embodiment, the slave mobile endpoint devices 110, 112 and 114 may pair with the master mobile endpoint device 108 over the PAN 104 to connect to the conference call. In other words, the mobile endpoint devices 110, 112 and 114 are connected to the conference call through the master mobile endpoint device 108. Said another way, the slave mobile endpoint devices 110, 112 and 114 are not used to directly join or "dial" into a conference bridge that is setup for a conference call.

In one embodiment, the PAN 104 may use a short-range open or ad hoc communications protocol. For example, the PAN 104 may use a Bluetooth® communications protocol, a ZigBee® communications protocol, a wireless universal serial bus (wUSB) communications protocol, and the like.

The master mobile endpoint device 108 and the slave mobile endpoint devices 110, 112 and 114 may be associated with different users. As a result, each one of the different users may use his or own mobile endpoint device 110, 112 or 114 as a personal hub to the conference call. In other words, each one of the different users may have his or her own "speaker" and "microphone" to the conference call and independent conference call controls (e.g., controls to the speaker and microphone) without the need to hover over the master mobile endpoint device 108 on speakerphone. However, it should be noted that the master and slave devices are not limited just to the speakerphone mode during the conference call. For example, all modes provided by the respective handset (the mobile phone), wired or wireless headset (in communication with the mobile phone), and speakerphone (internal of external to the mobile phone) can be equally utilized.

In one embodiment, the mobile endpoint devices 108, 110, 112 and 114 may be modified to perform the functions described herein. For example, the operating systems of the mobile endpoint devices 108, 110, 112 and 114 may be modified to allow the mobile endpoint devices 108, 110, 112 and 114 operate in either a master or slave mode for the communications protocol used to connect to one another over the PAN 104 and include various call controls and conference call controls described herein.

In one embodiment, the master mobile endpoint device 108 and the slave mobile endpoint devices 110, 112 and 114 may have installed an application programming interface (API) that runs a conference call application for performing the functions described herein. In one embodiment, the conference call API may allow a cellular telephone or smart phone to be a slave or a master device using a Bluetooth® connection. For example, currently, cellular telephones or smart phones only act as a master device that allows a slave input/output device such as a headset or an external speaker to connect to the smart phone. However, the smart phone typically cannot connect to another smart phone as a slave device via a Bluetooth® connection. In other words, the conference call API may modify the Bluetooth® communications protocol on the mobile endpoint devices 108, 110, 112 and 114 to allow the mobile endpoint devices 108, 110, 112 and 114 to operate as either a master device or a slave device for a conference call.

In one embodiment, the conference call API may provide conference call controls, which may be differentiated from call controls. The call control of the master mobile endpoint device 108 may provide various controls, e.g., calling a conference bridge, hanging up, or hook flashing that can be done at anytime. The conference call controls may include controls associated with the conference call that are discussed in further detail below. For example, the conference call controls may include muting, volume adjustments, selectively disconnecting one or more slave mobile endpoint devices, and the like. In one embodiment, only the master mobile endpoint device 108 may have both call controls and conference call controls and the slave mobile endpoint devices 110, 112 and 114 may only have some limited conference call controls.

As a result, when the slave mobile endpoint devices 110, 112 and 114 are connected to the conference call via the connection to the master mobile endpoint device 108 via the PAN 104, each one of the slave mobile endpoint devices 110, 112 and 114 may have slave conference call controls. For example, each one of the slave mobile endpoint devices 110, 112 and 114 may independently control its own volume level (e.g., louder or quieter), toggle a mute button, and the like.

In one embodiment, the master mobile endpoint device 108 may have master conference call controls in addition to the call controls discussed above. For example, the master mobile endpoint device 108 may display or list each one of the slave mobile endpoint devices 110, 112 and 114 that are paired with the master mobile endpoint device 108 via a display (e.g., a graphical user interface (GUI)). In one embodiment, the display may allow a user of the master mobile endpoint device 108 to selectively disconnect one or more of the slave mobile endpoint devices 110, 112 and 114, selectively mute one or more of the slave mobile endpoint devices 110, 112 and 114, and the like. The master mobile conference call controls may also include adjusting a master volume (e.g., louder or quieter), having a mute all function (e.g., muting the master device and all slave devices), an end conference call function, and the like. For example, if the master mobile endpoint device 108 terminates the conference call, then all of the slave mobile endpoint devices 110, 112 and 114 may automatically be disconnected or unpaired from the master mobile endpoint device 108.

It should be noted that unlike traditional pairing of a cellular telephone or smart phone to an external input/output Bluetooth® device, the master mobile endpoint device 108 may still be used for two-way communications on the conference call. For example, when a Bluetooth® headset is paired to a smart phone, all of the voice communications are sent over the headset. Typically, the smart phone is muted and communications cannot be sent or received over the smart phone while the headset is paired with the smart phone. In contrast, in the present disclosure, the conference call API may modify the communications protocol for the PAN 104 (e.g., Bluetooth®) to allow the master device (e.g., the master mobile endpoint device 108) to continue to send and receive communications in addition to acting as a conduit for connections to the conference call for the paired slave mobile endpoint devices 110, 112 and 114.

In one embodiment, the master mobile endpoint device 108 may send an authentication code or a pre-defined code to the slave mobile endpoint devices 110, 112 and 114. For example, most communications protocols for the PAN 104 use open or ad hoc protocols. As a result, any mobile endpoint device could snoop the signal broadcasted to the slave mobile endpoint devices 110, 112 and 114 to pair to the master mobile endpoint device 108. However, the authentication code may be used to require the slave mobile endpoint devices 110, 112 and 114 to provide the authentication code (e.g., an alphanumeric code of any length, such as for example, four digits) to the master mobile endpoint device 108 for authenticating a pairing request.

In one embodiment, whenever the master mobile endpoint device 108 receives a pairing request, the master mobile endpoint device 108 may provide an audible tone to the user. The audible tone may provide a notification to the user to alert them that other mobile endpoint devices are attempting to pair with his or her master mobile endpoint device 108. In one embodiment, the slave mobile endpoint devices 110, 112 and 114 may also provide an audible tone to the respective users when the pairing request is sent to the master mobile endpoint device 108.

A real life example is presented to illustrate the benefits of the present disclosure. For example, a user may be traveling on business with several business colleagues. The user and the colleagues may have a conference call that they need to connect to while they are travelling.

Previously, each user would be required to dial in separately on his or her respective mobile endpoint device. This could create echoes or lag to the other users on the conference call. In addition, the conference call bridge may have a limit to the number of users that may be able to join. If the conference bridge can only accommodate one more caller, then only one of the users who are travelling would be able to call in and the remaining business colleagues would have to huddle around a single mobile endpoint device placed on speakerphone mode to participate in the conference call.

However, using the present disclosure, one of the users may call into the conference call. Subsequently, the remaining business colleagues could pair to the user's master mobile endpoint device using a conference call API on the mobile endpoint devices over a PAN (e.g., a Bluetooth® connection). As a result, each user would have his or her own hub via his or her own respective mobile endpoint device to participate in the conference call. In one embodiment, a hub may be defined as having full two-way communications for the conference call and one or more independent conference call controls. In one embodiment, the conference call controls are independent in that a user may toggle one of his or her conference call controls without affecting the same control of another user. For example, the conference call controls may include volume adjustment or a mute button.

In another embodiment, no conference call service may be available. However, one of the users (e.g., referred to as the calling party) may directly call a called party. The remaining users may pair to the calling party's master mobile endpoint device using a conference call API on the mobile endpoint devices over the PAN (e.g., a Bluetooth® connection). As a result, each user would have his or her own hub via his or her own respective mobile endpoint device to participate on the call with the called party. In essence, an ad hoc conference call may be created even when no conference call bridge was previously reserved or established.

Figure 2:
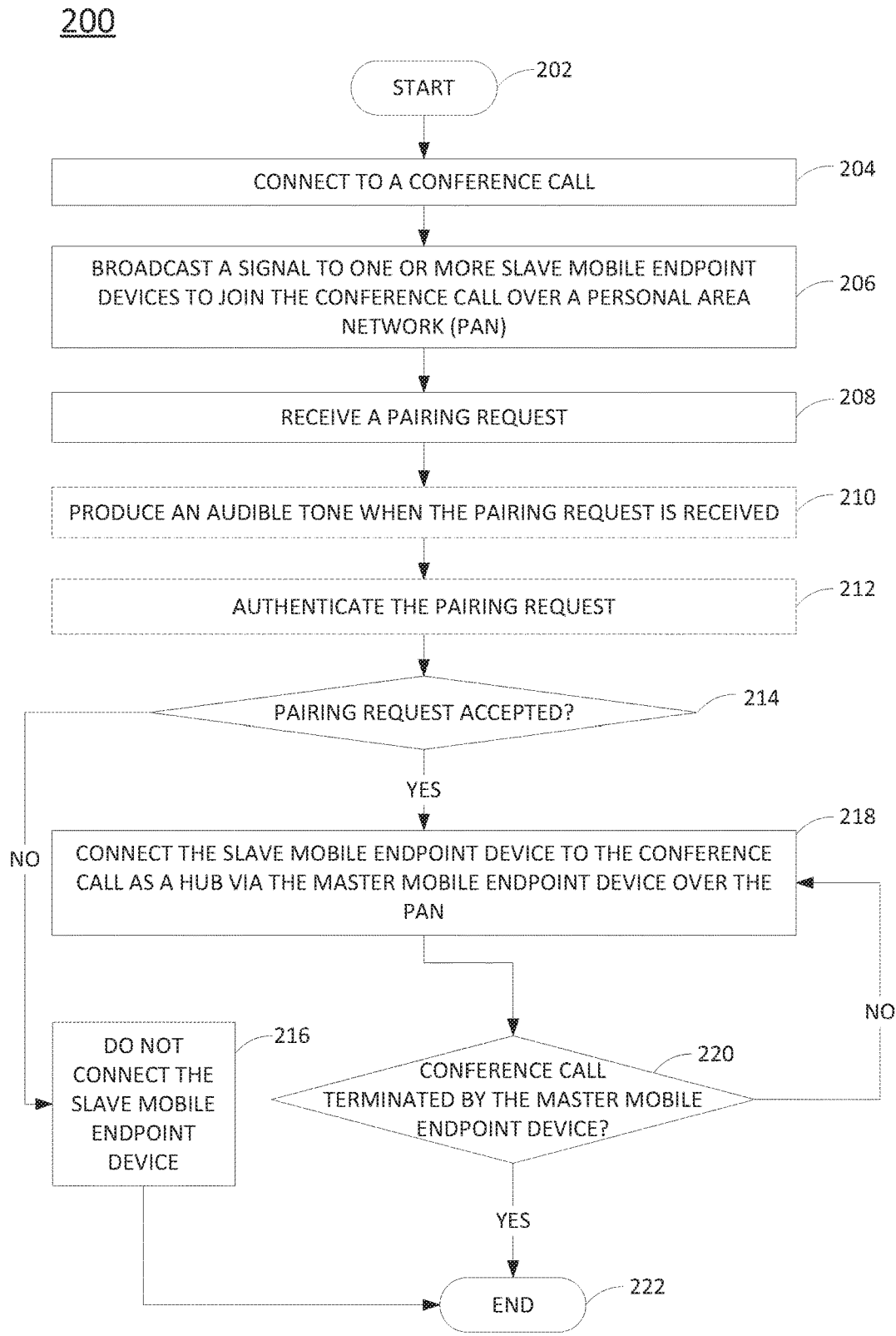
FIG. 2 illustrates an example flowchart of a method for enabling a mobile endpoint device to be a hub for a conference call from a perspective of a master mobile endpoint device.
Figure 4:
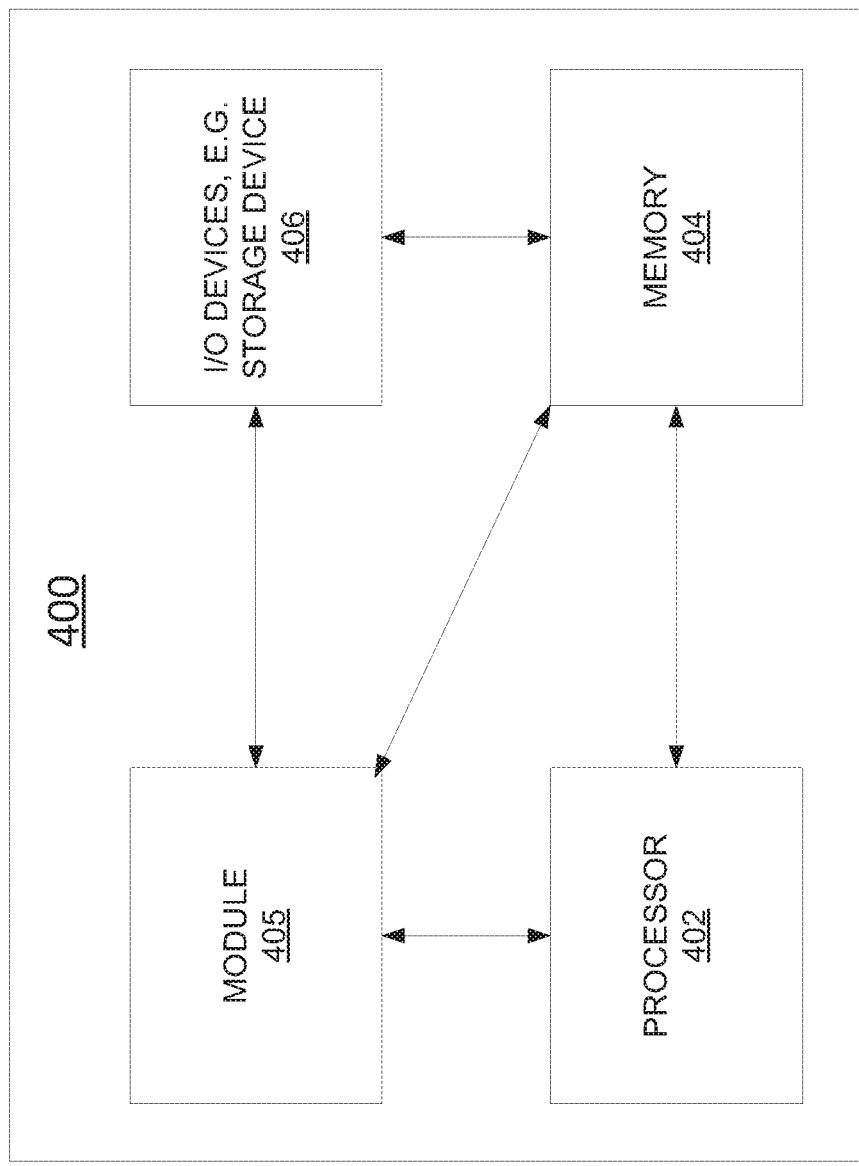
FIG. 4 illustrates a high-level block diagram of a general-purpose computer suitable for use in performing the functions described herein.

FIG. 2 illustrates a flowchart of a method 200 for enabling a mobile endpoint device to be a hub for a conference call. In one embodiment, the method 200 may be performed by the master mobile endpoint device 108 or a general purpose computer as illustrated in FIG. 4 and discussed below.

The method 200 begins at step 202. At step 204, the method 200 connects to a conference call. For example, the master mobile endpoint device may first dial into a conference bridge or with another caller.

At step 206, the method 200 may broadcast a signal to one or more slave mobile endpoint devices to join the conference call over a PAN. For example, the signal may be an indication that the conference call is connected and that the slave mobile endpoint devices should begin initiating requests to pair with the master mobile endpoint device. The signal may also include a pop up message is sent to the slave mobile endpoint device to notify the user to begin initiation of the pairing request.

In one embodiment, the PAN may use a Bluetooth® communications protocol, a ZigBee® communications protocol, a wUSB communications protocol, and the like. In one embodiment, the master mobile endpoint device and the slave mobile endpoint device may have installed and be running a conference call API to allow the mobile endpoint device to be a master or a slave device using one of the communications protocols described above for the PAN.

At step 208, the method 200 may receive a pairing request. For example, one or more of slave mobile endpoint devices may receive the broadcasted signal to join the conference call and are now initiating the pairing by sending a pairing request to the master mobile endpoint device.

At optional step 210, the method 200 may provide an audible tone when the pairing request is received. For example, the audible tone may provide a notification to the user of the master mobile endpoint device each time that a slave mobile endpoint device is attempting to pair with the master mobile endpoint device. This may allow the user of the master mobile endpoint device to manage the connections to the master mobile endpoint device and monitor which slave mobile endpoint devices are attempting to pair with the master mobile endpoint device.

At optional step 212, the method 200 may authenticate the pairing request. For example, a pre-defined code or an authentication code (e.g., a four digit alphanumeric code) may be sent to the desired one or more slave mobile endpoint devices. In one embodiment, the pre-defined code or the authentication code may be sent before the master mobile endpoint device connects to the conference call.

In one embodiment, after the pairing request is received, the master mobile endpoint device may send an authentication request to the slave mobile endpoint device. The master mobile endpoint device may then wait for a response. When the response is received, the master mobile endpoint device may verify that the received response matches the pre-defined code or the authentication code.

At step 214, the method 200 may determine if the pairing request is accepted. If the pairing request is not accepted (e.g., the response did not match the pre-defined code or authentication code at step 212 or a user of the master mobile endpoint device refuses the pairing request manually) the method 200 may proceed to step 216.

At step 216, the method 200 does not connect the slave mobile endpoint device to the master mobile endpoint device. The method 200 then proceeds to step 222 where the method 200 ends.

Referring back to step 214, if the method 200 accepts the pairing request, the method 200 may then proceed to step 218. At step 218, the method 200 may connect the slave mobile endpoint device to the conference call as a hub via the master mobile endpoint device over the PAN. For example, the slave mobile endpoint device may be paired to the master mobile endpoint device via Bluetooth® connection. As a result, the slave mobile endpoint device may have slave conference call controls and the master mobile endpoint device may have master conference call controls. In addition, the master mobile endpoint device and the slave mobile endpoint device may each have independent two-way communications with other callers on the conference call (e.g., the called party or other callers on a conference bridge).

At step 220, the method 200 determines if a conference call is terminated by the master mobile endpoint device. If the conference call is not terminated, the method 200 returns to step 218 where the slave mobile endpoint device remains connected to the conference call via the master mobile endpoint device. However, if the master mobile endpoint device terminates the conference call at step 220, the method 200 proceeds to step 222. At step 222, the method 200 ends.

Figure 3:
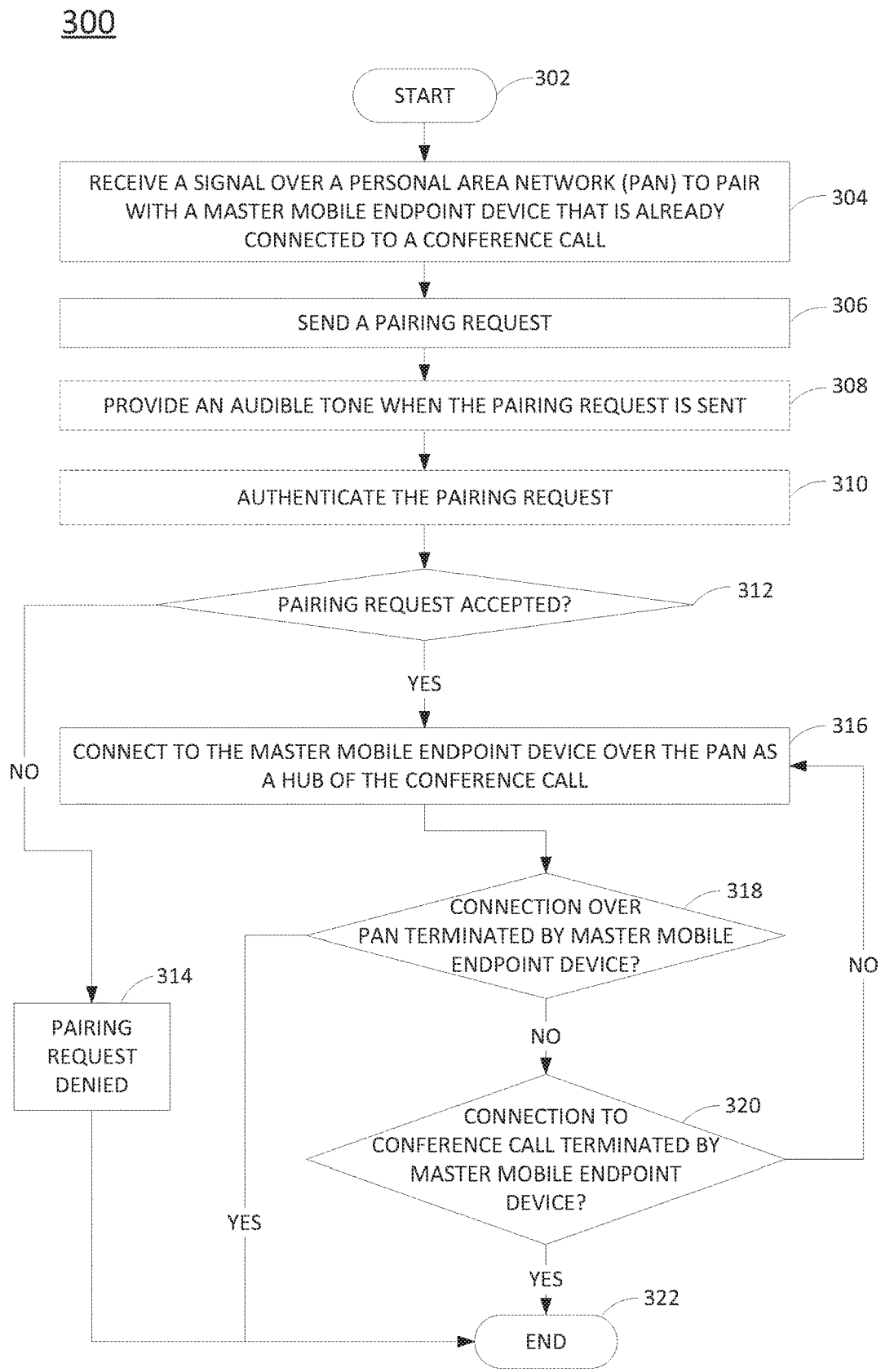
FIG. 3 illustrates an example flowchart of a method for enabling a mobile endpoint device to be a hub for a conference call from a perspective of a slave mobile endpoint device.

FIG. 3 illustrates a flowchart of a method 300 for enabling a mobile endpoint device to be a hub for a conference call. In one embodiment, the method 300 may be performed by any one of the slave mobile endpoint devices 110, 112 or 114 or a general purpose computer as illustrated in FIG. 4 and discussed below.

The method 300 begins at step 302. At step 304, the method 300 receives a signal over a personal area network (PAN) to pair with a master mobile endpoint device that is already connected to a conference call. For example, the signal may be an indication that the conference call is connected and that the slave mobile endpoint devices should begin initiating requests to pair with the master mobile endpoint device. The signal may also include a pop up message is sent to the slave mobile endpoint device to notify the user to begin initiation of the pairing request.

In one embodiment, the slave mobile endpoint device and the master mobile endpoint device may run a conference call API that allows the mobile endpoint devices to operate as a slave device or a master device in a communications protocol (e.g., Bluetooth®) used over the PAN. In one embodiment, the master mobile endpoint device may broadcast a signal using the communications protocol of the PAN.

At step 306, the method 300 send a pairing request. For example, the slave mobile endpoint device may initiate the pairing by sending a pairing request to the master mobile endpoint device.

At optional step 308, the method 300 may provide an audible tone when the pairing request is sent. In one embodiment, the audible tone may provide a notification to a user of the slave mobile endpoint device confirming that the pairing request was sent successfully and that the master mobile endpoint device has received the pairing request.

At optional step 310, the method 300 may authenticate the pairing request. For example, a pre-defined code or an authentication code (e.g., a four digit alphanumeric code) may be sent by one or more slave mobile endpoint devices to the master mobile endpoint device. In one embodiment, the pre-defined code or the authentication code may have been received by each of the slave mobile endpoint devices before the master mobile endpoint device connects to the conference call.

In one embodiment, after the pairing request is sent, the master mobile endpoint device may send an authentication request to the slave mobile endpoint device. The slave mobile endpoint device may then send a response to the master mobile endpoint device. The master mobile endpoint device may verify that the received response matches the pre-defined code or the authentication code.

At step 312, the method 300 determines if the pairing request is accepted. If the pairing request is not accepted (e.g., the response did not match the pre-defined code or authentication code at step 310 or a user of the master mobile endpoint device refuses the pairing request manually) the method 300 may proceed to step 314.

At step 314, the method 300 notifies the slave mobile endpoint device that the pairing request was denied. The method 300 then proceeds to step 322 where the method 300 ends.

Referring back to step 312, if the method 300 accepts the pairing request, the method 300 may then proceed to step 316. At step 316, the method 300 may connect the slave mobile endpoint device to the master mobile endpoint device over the PAN as a hub of the conference call. For example, the slave mobile endpoint device may be paired to the master mobile endpoint device via Bluetooth® connection. As a result, the slave mobile endpoint device may have slave conference call controls and the master mobile endpoint device may have master conference call controls. In addition, the master mobile endpoint device and the slave mobile endpoint device may each have independent two-way communications with other callers on the conference call (e.g., the called party or other callers on a conference bridge).

At step 318, the method 300 determines if the connection over the PAN is terminated by the master mobile endpoint device. For example, the master mobile endpoint device may have master conference call controls that include selectively disconnecting any one of a plurality of slave mobile endpoint devices paired to the master mobile endpoint device. If the connection over the PAN is terminated, the method 300 may proceed to step 322 where the method 300 ends.

However, if the connection over the PAN is not terminated, the method 300 may proceed to step 320. At step 320, the method 300 may determine if the connection to the conference call is terminated by the master mobile endpoint device. If the conference call is not terminated, the method 300 returns to step 316 where the slave mobile endpoint device remains connected to the conference call via the master mobile endpoint device. However, if the master mobile endpoint device terminates the conference call at step 320, the method 300 proceeds to step 322. At step 322, the method 300 ends.

It should be noted that although not explicitly specified, one or more steps or operations of the methods 200 and 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps, operations or blocks in FIGS. 2 and 3 that recite a determining operation, or involve a decision, do not necessarily require that both branches of the determining operation be practiced. In other words, one of the branches of the determining operation can be deemed as an optional step.

FIG. 4 depicts a high-level block diagram of a general-purpose computer suitable for use in performing the functions described herein. As depicted in FIG. 4, the system 400 comprises one or more hardware processor elements 402 (e.g., a central processing unit (CPU), a microprocessor, or a multi-core processor), a memory 404, e.g., random access memory (RAM) and/or read only memory (ROM), a module 405 for enabling a mobile endpoint device to be a hub for a conference call, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 405 for enabling a mobile endpoint device to be a hub for a conference call (e.g., a software program comprising computer-executable instructions) can be loaded into memory 404 and executed by hardware processor element 402 to implement the steps, functions or operations as discussed above in connection with the exemplary methods 200 and 300. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for enabling a mobile endpoint device to be a hub for a conference call (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for handling a conference call, the method comprising:
    connecting, by a processor of a master mobile endpoint device, to the conference call;
    broadcasting, by the processor, a signal to at least one slave mobile endpoint device to join the conference call over a personal area network;
    receiving, by the processor, a pairing request from the at least one slave mobile endpoint device over the personal area network;
    accepting, by the processor, the pairing request; and
    connecting, by the processor, the at least one slave mobile endpoint device to the conference call via the master mobile endpoint device over the personal area network, wherein both the master mobile endpoint device and the at least one slave mobile endpoint device have two-way communications with the conference call and conference call controls, wherein a first master mobile endpoint device conference call control of the conference call controls comprises a first user control on the master mobile endpoint device for adjusting a volume of a speaker of the at least one slave mobile endpoint device for the conference call, wherein the two-way communications include communications from a microphone of the master mobile endpoint device and communications to a speaker of the master mobile endpoint device.

2. The method of claim 1, wherein the accepting the pairing request comprises:
    authenticating, by the processor, the pairing request from the at least one slave mobile endpoint device.

3. The method of claim 2, wherein the authenticating comprises receiving a pre-defined code provided by the master mobile endpoint device.

4. The method of claim 1, further comprising:
  providing, by the processor, an audible tone when the pairing request is received from the at least one slave mobile endpoint device.

5. The method of claim 1, wherein the at least one slave mobile endpoint device comprises a plurality of slave mobile endpoint devices.

6. The method of claim 1, wherein the personal area network uses a near field communications protocol.

7. The method of claim 1, further comprising:
  displaying, by the processor, a list of the at least one slave mobile endpoint device that is connected to the master mobile endpoint device.

8. The method of claim 1, wherein a slave mobile endpoint device conference call control comprises a control for muting the at least one slave mobile endpoint device.

9. The method of claim 1, wherein the master mobile endpoint device and the at least one slave mobile endpoint device both have a wireless communication service subscription.

10. The method of claim 1, further comprising:
  executing, by the processor, a conference call application programming interface on the master mobile endpoint device to perform the connecting of the at least one slave mobile endpoint device to the conference call via the master mobile endpoint device over the personal area network.

11. A computer-readable storage device storing a plurality of instructions which, when executed by a processor of a master mobile endpoint device, cause the processor to perform operations for handling a conference call, the operations comprising:
  connecting to the conference call;
  broadcasting a signal to at least one slave mobile endpoint device to join the conference call over a personal area network;
  receiving a pairing request from the at least one slave mobile endpoint device over the personal area network;
  accepting the pairing request; and
  connecting the at least one slave mobile endpoint device to the conference call via the master mobile endpoint device over the personal area network, wherein both the master mobile endpoint device and the at least one slave mobile endpoint device have two-way communications with the conference call and conference call controls, wherein a first master mobile endpoint device conference call control of the conference call controls comprises a first user control on the master mobile endpoint device for adjusting a volume of a speaker of the at least one slave mobile endpoint device for the conference call, wherein the two-way communications include communications from a microphone of the master mobile endpoint device and communications to a speaker of the master mobile endpoint device.

12. The computer-readable storage device of claim 11, wherein the accepting the pairing request comprises:
  authenticating the pairing request from the at least one slave mobile endpoint device.

13. The computer-readable storage device of claim 12, wherein the authenticating comprises receiving a pre-defined code provided by the master mobile endpoint device.

14. The computer-readable storage device of claim 11, the operations further comprising:
  providing an audible tone when the pairing request is received from the at least one slave mobile endpoint device.

15. The computer-readable storage device of claim 11, wherein the personal area network uses a near field communications protocol.

16. The computer-readable storage device of claim 11, the operations further comprising:
  displaying a list of the at least one slave mobile endpoint device that is connected to the master mobile endpoint device.

17. The computer-readable storage device of claim 11, wherein a slave mobile endpoint device conference call control comprises a control for muting the at least one slave mobile endpoint device.

18. The computer-readable storage device of claim 11, wherein the master mobile endpoint device and the at least one slave mobile endpoint device both have a wireless communication service subscription.

19. The computer-readable storage device of claim 11, the operations further comprising:
  executing a conference call application programming interface on the master mobile endpoint device to perform the connecting of the at least one slave mobile endpoint device to the conference call via the master mobile endpoint device over the personal area network.

20. A method for handling a conference call, the method comprising:
  receiving, by a processor of a slave mobile endpoint device, a signal to pair with a master mobile endpoint device to join the conference call over a personal area network, wherein the master mobile endpoint device has established a connection to the conference call;
  sending, by the processor, a pairing request over the personal area network;
  receiving, by the processor, an indication that the pairing request is accepted; and
  connecting, by the processor, to the master mobile endpoint device over the personal area network, wherein the master mobile endpoint device and the slave mobile endpoint device both have two-way communications with the conference call and conference call controls, wherein a first master mobile endpoint device conference call control of the conference call controls comprises a first user control on the master mobile endpoint device for adjusting a volume of a speaker of the slave mobile endpoint device for the conference call, wherein the two-way communications include communications from a microphone of the master mobile endpoint device and communications to a speaker of the master mobile endpoint device.

* * * * *